(12) United States Patent
Miyawaki et al.

(10) Patent No.: US 10,730,692 B2
(45) Date of Patent: Aug. 4, 2020

(54) DRIP BAG

(71) Applicant: OHKI CO., LTD., Osaka-shi, Osaka (JP)

(72) Inventors: Akiko Miyawaki, Osaka (JP); Mitsunori Saitoh, Takatsuki (JP)

(73) Assignee: OHKI CO., LTD., Osaka-shi (JP)

(*) Notice: Subject to any disclaimer, the term of this patent is extended or adjusted under 35 U.S.C. 154(b) by 50 days.

(21) Appl. No.: 14/426,863

(22) PCT Filed: Dec. 11, 2013

(86) PCT No.: PCT/JP2013/083260
§ 371 (c)(1),
(2) Date: Mar. 9, 2015

(87) PCT Pub. No.: WO2014/092136
PCT Pub. Date: Jun. 19, 2014

(65) Prior Publication Data
US 2016/0001969 A1 Jan. 7, 2016

(30) Foreign Application Priority Data

Dec. 11, 2012 (WO) .................. PCT/JP2012/082113

(51) Int. Cl.
*B65D 85/804* (2006.01)
*A47J 31/06* (2006.01)
*A47J 31/02* (2006.01)

(52) U.S. Cl.
CPC .......... *B65D 85/8046* (2013.01); *A47J 31/02* (2013.01); *A47J 31/0626* (2013.01); *A47J 31/0636* (2013.01)

(58) Field of Classification Search
CPC .. B65D 85/8046; B65D 85/812; B65D 77/00; A47J 31/06; A47J 31/02; A47J 31/08;
(Continued)

(56) References Cited

U.S. PATENT DOCUMENTS 2,859,878 A * 11/1958 Spiselman ............... A47J 31/06
210/472
4,374,026 A * 2/1983 Greutert .................. A47J 31/08
210/493.5
(Continued)

FOREIGN PATENT DOCUMENTS

CN 102670075 A 9/2012
EP 2281492 A1 2/2011
(Continued)

OTHER PUBLICATIONS

WO 2009020132 Espacenet Translation (Description of corresponding document JP 5152779).*
(Continued)

*Primary Examiner* — Erik Kashnikow
*Assistant Examiner* — Ashley Axtell
(74) *Attorney, Agent, or Firm* — Oliff PLC (57) ABSTRACT

A drip bag with hook members adhered to the outer surfaces of two opposing-face sheets of a bag body is configured to increase the area of an opening of the bag body and stabilize the shape of the opening. A drip bag has a body formed of a water-permeable filtering sheet, an upper end to be opened, and hook members formed of a thin plate-shaped material and provided on outer surfaces of two opposing-face sheets of the bag body. The hook member includes: an upper-stuck part adhered to the bag body along the opening; a center part below the upper-stuck part at the center in the width direction thereof and formed so as not to be pulled out from the bag body; and a hook part not adhered to the bag body. First oblique folding lines and second oblique holding lines are formed on the upper-stuck part by respective angles.

20 Claims, 7 Drawing Sheets

(58) Field of Classification Search
CPC .. A47J 31/0626; A47J 31/085; A47J 31/0636; A47G 19/16; A47G 19/145
USPC .............. 426/77–87, 106, 115; 99/279, 323, 99/323.3, 306; 210/474, 478
See application file for complete search history.

(56) References Cited

U.S. PATENT DOCUMENTS

| | | | | |
|---|---|---|---|---|
| 4,519,911 A | * | 5/1985 | Shimizu .................. | A47J 31/02 210/478 |
| 4,735,719 A | * | 4/1988 | Benedict ................ | A47J 31/06 210/474 |
| 4,981,588 A | * | 1/1991 | Poulallion .............. | A47J 31/02 210/474 |
| 5,055,311 A | * | 10/1991 | Brauer, Jr. ............. | A47J 31/02 210/497.3 |
| 7,235,272 B2 | * | 6/2007 | Saitoh .................... | A47J 31/02 426/77 |
| 2002/0185010 A1 | * | 12/2002 | Spiteri ................... | A47J 31/08 99/285 |

FOREIGN PATENT DOCUMENTS

| | | | | | |
|---|---|---|---|---|---|
| JP | 2004-024763 | A | | 1/2004 | |
| JP | 2004242847 | A | | 9/2004 | |
| JP | 3674486 | B2 | | 7/2005 | |
| JP | 2006036357 | A | * | 2/2006 | |
| JP | 2006-273379 | A | | 10/2006 | |
| JP | WO 2007018302 | A1 | * | 2/2007 | ............. A47J 31/02 |
| JP | 4079041 | B2 | | 4/2008 | |
| JP | WO 2009020132 | A1 | * | 2/2009 | ............. A47J 31/02 |
| JP | 2012-125406 | A | | 7/2012 | |
| JP | 2012-143418 | A | | 8/2012 | |
| JP | 2012-179265 | A | | 9/2012 | |
| JP | 2012188134 | A | * | 10/2012 | |
| KR | 20110022565 | A | | 3/2011 | |

OTHER PUBLICATIONS

WO 2007018302 Espacenet Translation (Description of corresponding document EP 1923324).*
JP 2012188134 Espacenet Translation.*
JP 2006036357 Espacenet Translation.*
JP 2006036357 USPTO Translation.*
JP 2012188134 USPTO Translation.*
Jan. 14, 2014 International Search Report issued in International Patent Application No. PCT/JP2013/083260.
Jul. 6, 2016 European Search Report issued in European Patent Application No. 13863336.7.
Apr. 26, 2016 Office Action issued in Taiwanese Patent Application No. 102145789.
Jun. 26, 2017 Office Action issued in Russian Patent Application No. 2015111673.
Oct. 21, 2015 Office Action issued in Korean Patent Application No. 2014-7034389.

* cited by examiner

DRIP BAG

TECHNICAL FIELD

The present invention relates to a drip bag which is hooked on the upper portion of a container such as cups, thereby allowing an extract such as coffee, tea, green tea, or Chinese herbal medicine to be readily provided by a drip method.

BACKGROUND ART

Conventionally, the paper drip method has been widely accepted as a coffee serving method that enables one to enjoy genuine coffee in an easy-to-prepare manner. This paper drip method typically allows several cups of coffee to be extracted at a time.

On the other hand, more and more people live alone these days and the number of people in one family has been reduced, for example, due to an increase in the number of nuclear families and a drop in birth rate. Thus, in place of the conventional paper drip method that is basically adapted to extract several cups of coffee, such disposable drip bags that are intended to extract one cup of coffee in an easy-to-prepare manner have been available in various product types in the market.

Among other things, now available is a drip bag in a simple structure that can be manufactured at low costs. The drip bag has a bag body made of a water permeable filtering sheet and paper plate hook members that are adhered to the outer surfaces of the two opposing face sheets of the bag body, with the hook members formed in a special shape (Patent Literature 1).

Figure 9:
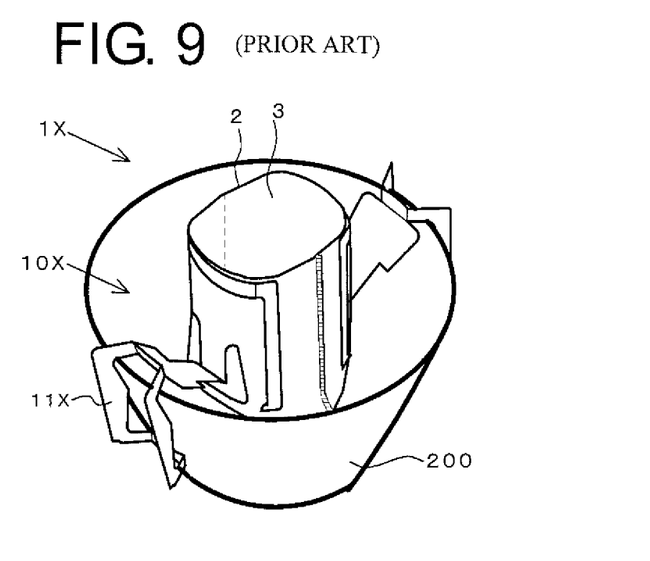
FIG. 9 is a perspective view illustrating a conventional drip bag which is set on a cup.

As shown in FIG. 9, according to the drip bag 1X, hook parts 11X of hook members 10X are pulled out from a bag body 2 so as to hook the hook parts 11X on a cup 200. This allows the drip bag 1X to be easily set to the cup 200 with the opening 3 of the bag body 2 kept open.

CITATION LIST

Patent Literature

[Patent Literature 1] Japanese Patent No. 4079041

SUMMARY OF INVENTION

Technical Problem

When being used with a cup of a typical opening diameter, the drip bag 1X mentioned above allows the opening 3 of the bag body 2 to be widely opened in a rectangular shape as shown in FIG. 9, so that hot water can be easily poured into the bag body 2. However, to further facilitate pouring hot water through the opening 3, the opening area of the opening is desirably further increased. To increase and thereby maximize the opening area of the opening 3 using the same bag body, it is conceivable to open the opening 3 in the shape of a perfect circle. However, the difference in rigidity between the water permeable filtering sheet forming the bag body 2 and the thin plate-shaped material forming the hook members 10X should be satisfied. Easiness should also be satisfied which is required of the opening manipulation to open the opening 3 of the bag body 2 only by pulling, in the mutually opposite directions, the pair of hook members adhered to the two opposing face sheets of the bag body 2. From these points of view, it is impossible to open the opening 3 in the shape of a perfect circle.

In contrast to this, an object of the present invention is to provide a drip bag which has a simple structure with the hook members adhered to the outer surfaces of the two opposing face sheets of the bag body and in which when the drip bag is set to a cup, the opening area of the opening of the bag body is significantly increased.

Solution to Problem

The inventor has found the following feature and thus completed the present invention. The feature is provided by a drip bag with a simple structure in which hook members are adhered to the outer surfaces of two opposing face sheets of a bag body, the drip bag being configured such that a plurality of folding lines are formed on an upper stuck part adhered along the opening of the bag body so that the opening can be opened in the shape of a polygon having eight or more corners; the folding lines are obliquely oriented relative to the upper side of the upper stuck part; and furthermore, a special relation is imparted to the oblique angles between the plurality of folding lines. This feature allows the opening to be readily opened in the shape of a polygon having eight corners or more only by pulling, in the opposite directions, the hook members on the two opposing face sheets of the bag body.

That is, the present invention provides a drip bag which has a bag body formed of a water permeable filtering sheet and having an upper end to be opened, and hook members formed of a thin plate-shaped material and provided on outer surfaces of two opposing face sheets of the bag body. The hook member includes: an upper stuck part which is adhered to the bag body along the opening of the bag body; a center part which is located below the upper stuck part at the center of the bag body in the width direction thereof and formed so as not to be pulled out from the bag body; and a hook part not adhered to the bag body. Two or more pairs of oblique folding lines are formed on the upper stuck part with a center line disposed between the oblique folding lines of each pair and tilted so as to be more spaced apart from the center line in the direction from the lower side to the upper side of the upper stuck part, the center line bisecting the bag body in the width direction thereof. The drip bag is configured such that an angle $\theta 1$ formed by the center line and a first one of the oblique folding lines closer to the center line and an angle $\theta 2$ formed by the center line and a second oblique folding line that is farther away from the center line than the first oblique folding line satisfy $0 < \theta 2 \leq \theta 1$.

Advantageous Effects of Invention

According to the drip bag of the present invention, when the pair, of opposing hook parts on the outer surfaces of the bag body are pulled out in the opposite directions and then hooked on a cup, two or more pairs of oblique folding lines formed on the upper stuck part along the opening of the bag body allow the opening of the bag body to be opened in the shape of a polygon having eight or more corners, preferably in a generally regular decagon. When compared with a case where the opening is opened in the shape of a rectangle, the opening area can be significantly increased. For example, this allows the opening area of the opening to be increased by about 23% when compared with a conventional drip bag having a bag body of which opening is opened in a rectangular shape even when a stuck member and a bag body of the same raw material, shape, and size as those of the conventional drip bag are used. Thus, the ease of use of the drip bag is improved, for example, hot water can be poured more easily through the opening of the drip bag.

DESCRIPTION OF EMBODIMENTS

Now, a description will be made to a drip bag of the present invention in more detail with reference to the drawings. Note that in each of the drawings, like reference symbols indicate like or equivalent components.

Figure 1:
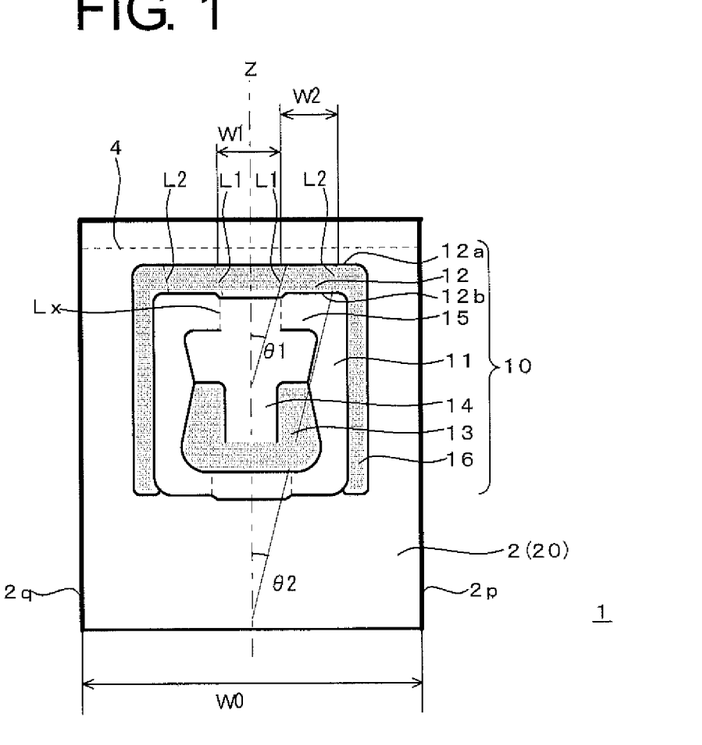
FIG. 1 is a plan view illustrating a drip bag 1 of an embodiment before being opened.

FIG. 1 is a plan view illustrating a drip bag 1 before being opened according to an embodiment of the present invention. The drip bag 1 has a bag body 2 with two opposing surfaces, and hook members 10 which are provided on outer surfaces of the two opposing face sheets of the bag body 2.

The bag body 2 is formed of a water permeable filtering sheet in the shape of a flat bag which is rectangular when viewed from above, and is provided with an opening guide line 4 such as perforations for forming an opening on the upper end. The bag body 2 is filled with a material to be extracted such as coffee, tea, green tea, or Chinese herbal medicine.

Figure 2:
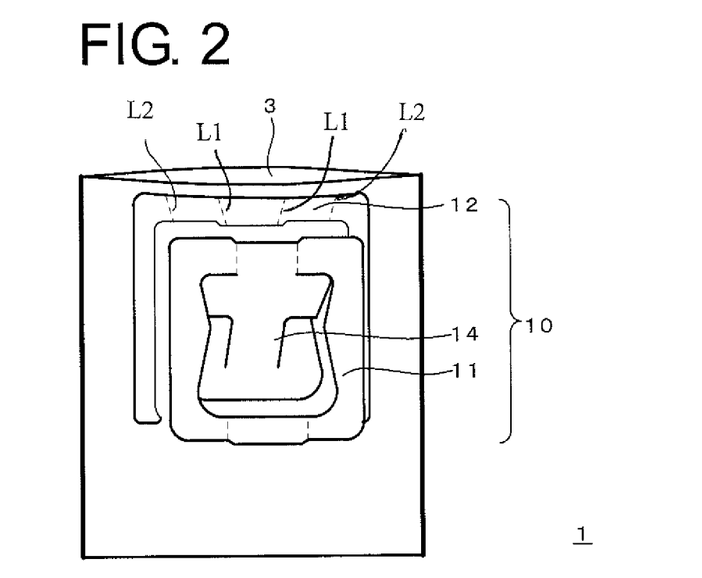
FIG. 2 is a perspective view illustrating the drip bag 1 of the embodiment after being opened.

FIG. 2 is a perspective view illustrating the state in which the upper end of the drip bag 1 is removed and opened to form an opening 3 along the opening guide line 4, and then hook parts 11 of the hook members 10 are being pulled out from the bag body 2.

Here, the hook members 10 of the drip bag 1 are formed by punching a thin plate-shaped material such as a paper plate or a plastic sheet and then adhered to the bag body 2. In FIG. 1, the areas shaded by dots are formed in such a manner that part or the entirety of the hook member 10 on the shaded areas is adhered to the outer surface of the bag body 2 by heat sealing or adhesion and thus cannot be pulled off from the surface of the bag body 2.

The drip bag of the present invention is provided with two opposing face sheets on the bag body, and provided on each of the surfaces is the hook member 10 including: an upper stuck part to be adhered to the bag body 2 along the opening 3 of the bag body 2; a center part which is located below the upper stuck part at the center in the width direction of the bag body 2 and formed so as not to be pulled out from the bag body 2; and the hook part 11 which is not adhered to the bag body 2. In particular, the drip bag 1 of this embodiment is configured such that the hook member 10 has, as the upper stuck part, an elongated stuck part 12 that is adhered in the shape of a strip to the bag body 2 along the opening 3; and as the center part, a center stuck part 13 that is adhered to the center of the bag body 2. Furthermore, the drip bag 1 has arm parts 14 that are formed to be capable of being pulled out from the bag body 2.

More specifically, the center stuck part 13 is formed in the shape of a concave with the entire surface thereof adhered to the bag body.

The arm part 14 is located above the center stuck part 13, and the lower end of the arm part 14 is continuous with the recessed portion of the concave of the center stuck part 13. Thus, the arm part 14 is pulled out at the upper end thereof.

The hook part 11 is formed to surround the center stuck part 13 and the arm part 14, and the upper portion of the hook part 11 is continuous with the upper end of the arm part 14. Furthermore, the hook part 11 is provided, on both sides of the upper portion thereof, with a pair of hooks 15 extending generally in the horizontal direction, and with folding lines Lx formed in the vertical direction at side ends of the center part on the bag body.

There is also provided a reinforcement part 16 which extends along the outer side of the hook part 11 in the vertical direction from both the right and left ends of the elongated stuck part 12 and which is adhered to the bag body 2.

The drip bag 1 is configured such that a total of two pairs, i.e., a pair of first oblique folding lines L1 and a pair of second oblique folding lines L2 are formed side by side on the elongated stuck part 12, the oblique folding lines of each pair being arranged with a center line Z therebetween and tilted so as to be more spaced apart from the center line Z in the direction from the lower side 12b to the upper side 12a of the elongated stuck part 12, the center line Z bisecting the bag body 2 in the width direction.

The drip bag 1 is also characterized in that the relation, $0<\theta 2 \leq \theta 1$, is satisfied where the angle $\theta 1$ is formed by the center line Z and the first oblique folding line L1 closer to the center line Z, and the angle $\theta 2$ is formed by the center line Z and the second oblique folding line L2 that is farther away from the center line Z than the first oblique folding line L1 is. This arrangement allows both the first oblique folding lines L1 and the second oblique folding lines L2 to be folded and the opening 3 of the bag body 2 to be opened to form a polygon with eight corners or more only by opening the drip bag 1 and then pulling, in the opposite directions, the hook parts 11 of the pair of hook members 10 adhered to the opposing face sheets of the bag body 2. In contrast to this, for $\theta 1<\theta 2$, pulling the pair of hook parts 11 in the opposite directions would cause the first oblique folding lines L1 closer to the center line Z to be naturally folded, but the second oblique folding lines L2 farther away from the center line Z to be less prone to being folded. Thus, the opening 3 is more likely to be opened in the shape of a flat rectangle.

This is because of the effects below that the inventor found. That is, when the pair of hook parts 11 are pulled in the opposite directions, the closer the oblique folding lines are to the center line Z, the more easily the oblique folding lines are folded. Furthermore, the smaller the angle between the oblique folding lines and the center line Z, that is, the closer the angle between the oblique folding lines and the upper side 12a of the upper stuck part 12 is to a right angle, the more easily the oblique folding lines are folded. In this context, from the viewpoint of the formation position, the second oblique folding lines L2 are farther away from the center line Z than the first oblique folding lines L1 closer to the center line Z, and thus folded less easily than the first oblique folding lines L1. However, the relation, θ2≤θ1, is established so that the second oblique folding lines L2 are more easily folded than the first oblique folding lines in terms of the magnitude of the angle. This relation allows not only the first oblique folding lines L1 closer to the center line Z but also the second oblique folding lines L2 farther away from the center line Z than the first oblique folding lines L1 to be naturally folded only by pulling the pair of hook parts 11 in the opposite directions. Note that depending on, for example, the separation between the first oblique folding line L1 and the second oblique folding line L2, there may be no significant difference in the ease of folding between the lines in terms of the formation position, in the case of which the relation θ1=θ2 may thus be assumed.

On the other hand, the second oblique folding line L2 and the center line Z may form an angle of zero, that is, the second folding line may be formed to be perpendicular to the upper side 12a of the upper stuck part 12. This is not preferable because when the pair of hook parts 11 are pulled in the opposite directions, only the second folding lines are folded without the first oblique folding lines L1 being folded.

The oblique folding lines and the center line may form a negative angle, that is, the oblique folding lines may be tilted so as to approach the center line Z of the width of the bag body 2 in a direction from the lower side 12b to the upper side 12a of the upper stuck part 12. This is not preferable because this will lead to a twist with the opening 3 of the bag body 2, causing the opening 3 not to be fully opened.

The aforementioned relation between θ1 and θ2 holds true even when three or more pairs of oblique folding lines are formed with the center line Z disposed between the oblique folding lines of each pair. Thus, all the oblique folding lines may be defined so as to satisfy the relation, $0<\theta n \leq \theta n-1$ (for $n\geq 2$), where θn is the angle formed by the center line Z and the nth oblique folding line from the center line Z, and θn−1 is the angle formed by the center line Z and the (n−1)th oblique folding line from the center line Z. In this case, when the pair of hook parts 11 are pulled in the opposite directions, any oblique folding lines are readily folded, and thus the opening 3 of the bag body 2 can be easily opened in the shape of a polygon.

The drip bag 1 is also configured such that the first oblique folding lines L1 and the second oblique folding lines L2 are formed to be easily folded so that these folding lines can be folded only by pulling the pair of hook parts 11 in the opposite directions. For example, with respect to the length of the cuts, the ties are preferably made as short as possible and the number of the ties is made as small as possible. These folding lines may also be formed only as cutting lines. Taking into account the workability of adhering the hook members 10 to the water permeable filtering sheet that forms the bag body 2, two ties or less would be preferably provided. Note that the first oblique folding lines L1 and the second oblique folding lines L2 are creased so that the lines are easily folded, and may also be formed by being cut halfway therethrough.

Figure 3A:
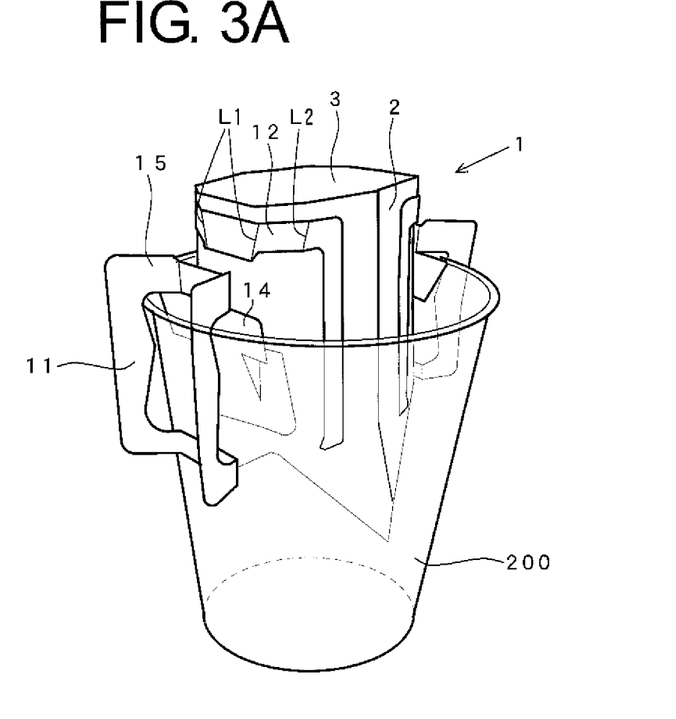
FIG. 3A is a perspective view illustrating the drip bag 1 of the embodiment which is set on a cup.
Figure 3B:
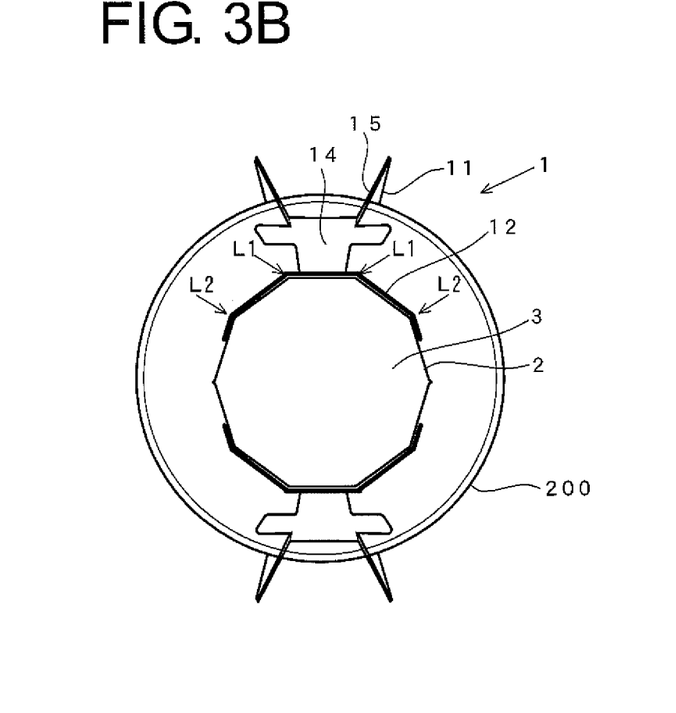
FIG. 3B is a top view illustrating the drip bag 1 of the embodiment which is set on a cup.
Figure 3C:
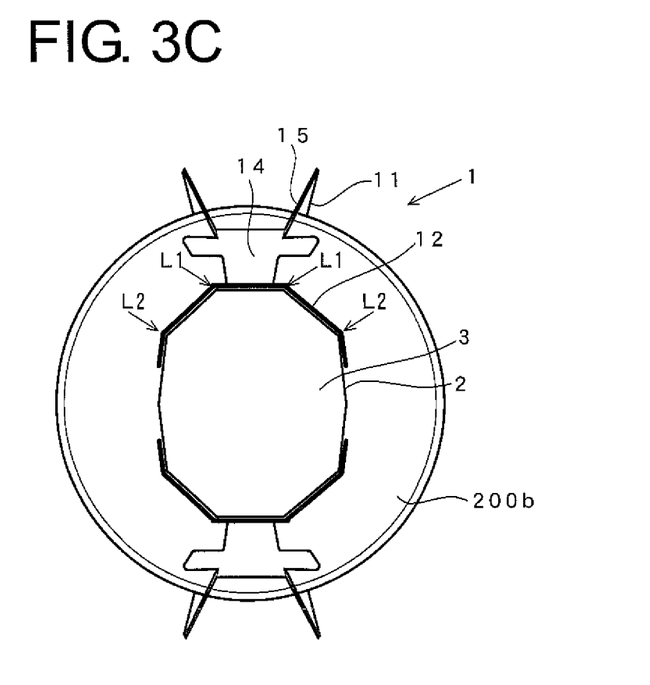
FIG. 3C is a top view illustrating the drip bag 1 of the embodiment which is set on a bigger cup.

Concerning the formation position of the first oblique folding lines L1 and the second oblique folding lines L2, the separation w1 on the upper side 12a of the upper stuck part 12 between the pair of first oblique folding lines L1 may be made equal to the separation w2 on the upper side 12a of the upper stuck part 12 between the first oblique folding line L1 and the second oblique folding line L2 which are adjacent to each other. In this case, when the drip bag 1 is set on a cup 200, the opening of the drip bag 1 can be preferably opened in the shape of a generally regular decagon as shown in FIG. 3B. This allows the opening area to be increased by about 23% when compared with a conventional drip bag having a rectangular opening shape even when a stuck member and a bag body of the same raw material, shape, and size as those of the conventional drip bag are used. Thus, the ease of use of the drip bag is noticeably improved. Note that as shown in FIG. 3C, when the drip bag 1 is set to a cup 200b having a larger cup opening diameter, the opening of the drip bag 1 takes the shape of an octagon. However, even in this case, the opening shape is increased in opening area when compared with the conventional rectangular drip bag.

The same holds true when three or more pairs of oblique folding lines are formed. On the upper side 12a of the upper stuck part 12, all the separations between the adjacent oblique folding lines may be made equal to each other, thereby allowing the opening 3 of the bag body 2 to be opened in a shape that is closer to the shape of a perfect circle.

On the other hand, as the water permeable filtering sheet 20 for forming the bag body 2, various types of sheets may be used which allow a predetermined amount of extraction material to effuse when the extraction material is charged into the bag body and hot water is poured therein. In general, known as the effusion sheet are, for example, synthetic fiber such as polyester, nylon, polyethylene, polypropylene, or vinylon; semisynthetic fiber such as rayon; woven fabric or nonwoven fabric of single or composite fiber of natural fiber such as mulberry and mitsumata plant; mixed paper of Manila hemp, wood pulp, polypropylene fiber or the like; and papers such as tea bag base paper. These can also be used for the present invention.

To reduce loads to the environment, unbleached fiber may be used to form the water permeable filtering sheet 20, and unbleached thin plate-shaped material may be used to form the hook member 10. Furthermore, from the viewpoint of disposal of drip bags after use, it is preferable for the water permeable filtering sheet material and the thin plate-shaped material to contain biodegradable fiber. Biodegradable fibers may include polylactic acid, polybutylene succinate, and polyethylene succinate.

Furthermore, for an extract material such as coffee powder, moderate steaming effects can be preferably imparted to the extraction material when being dripped. In this context, in manufacturing the water permeable filtering sheet from a fiber material, it is possible to employ a dense and non-dense multi-layer structure in which the voidage of the fiber layers can be adjusted to make a layer directly in contact with the extraction material "non-dense," whereas the layer not directly in contact therewith is made "dense." In this structure, it is preferable to provide a higher content of hydrophobic fiber to the layer directly in contact with the extraction material and a lower content of hydrophobic fiber to the layer not directly in contact with the extraction material (Japanese Patent No. 3674486).

In a method for using the drip bag 1, the upper end of the bag body 2 is first cut away along the opening guide line 4 such as perforations to thereby open the bag body 2. Then, as shown in FIG. 2, the arm parts 14 and the hook parts 11 of the pair of hook members 10 on the front and rear face sheets of the bag body 2 are pulled out and then further pulled out to hook the hook parts 11 on the cup 200 as shown in FIG. 3A. This allows the opening 3 of the bag body 2 to be opened in the shape of a generally regular decagon as shown in FIG. 3B.

Figure 4:
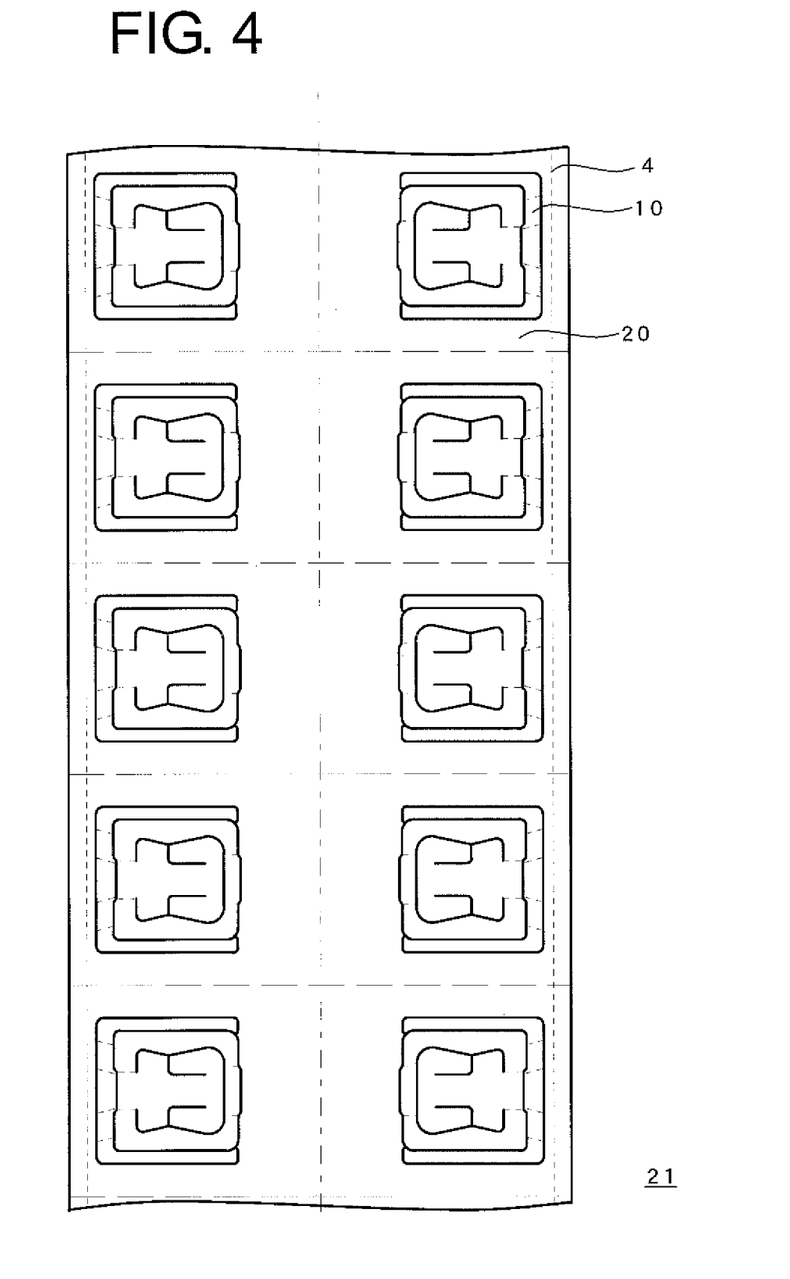
FIG. 4 is a plan view illustrating a drip bag sheet used to manufacture the drip bag 1 of the embodiment.

A method for manufacturing the drip bag of the present invention includes, for example as shown in FIG. 4, a step of preparing a drip bag sheet 21 with elongated water permeable filtering sheets 20 on which a plurality of pairs of hook members 10 are arranged at predetermined intervals so that the bottoms in each pair are spaced apart from and opposed to each other. The method further includes the steps of: folding the sheet 21 into two so that the edge sides in the longitudinal direction overlap with each other; and repeatedly welding and cutting the bag body 2 in the transverse direction at intervals of the width thereof while an extraction material such as coffee powder is charged into the bag body one by one. The portions welded and cut as mentioned above are both the side edges 2p and 2q of the bag body 2 (FIG. 1). Furthermore, prior to the welding and cutting in the transverse direction, the water permeable filtering sheet 21 is provided in advance with the opening guide line 4 such as perforations as an opening line for ease of opening. Note that the perforations 4 as the opening guide line 4 may be replaced by a line-shaped fragile portion that is provided, for example, by ultrasound or heat.

The drip bag of the present invention can be implemented in various aspects. For example, as the oblique folding lines provided on the upper stuck part, it is also acceptable to form three or more pairs of oblique folding lines with the center line Z disposed between the oblique folding lines of each pair, the center line Z bisecting the bag body 2 in the direction of the width thereof. By increasing the number of oblique folding lines, the opening shape of the drip bag can be made closer to the shape of a perfect circle. From the viewpoint of ease of processing during the manufacturing of the drip bag, two or three pairs of oblique folding lines are preferable as the number of oblique folding lines.

Figure 5:
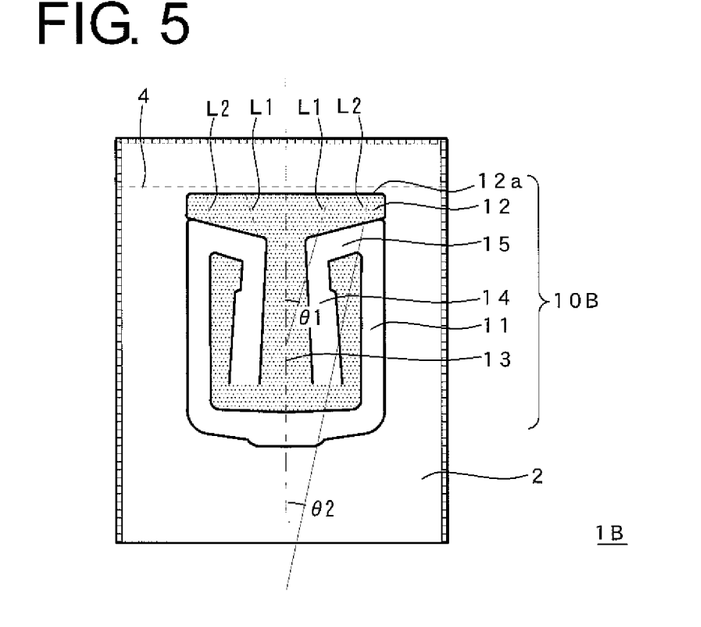
FIG. 5 is a plan view illustrating a drip bag 1B of an embodiment before being opened.
Figure 6:
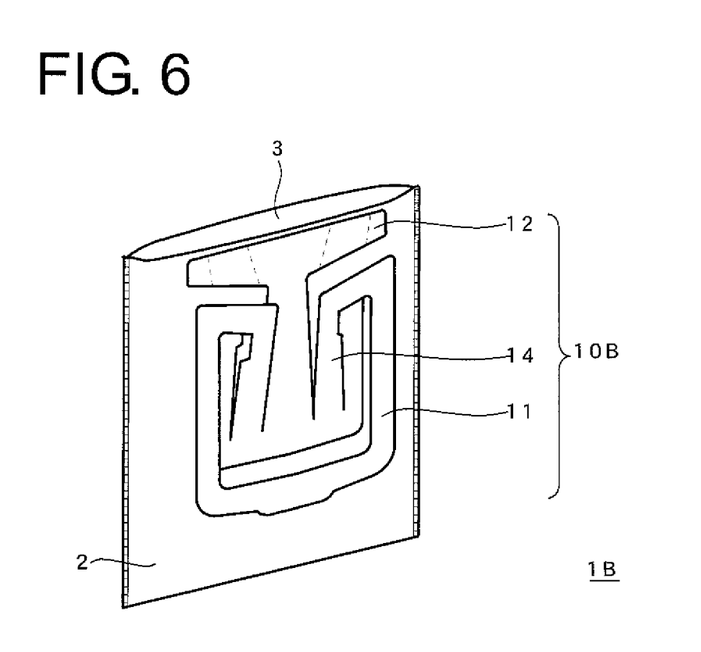
FIG. 6 is a perspective view illustrating the drip bag 1B of the embodiment after being opened.

Furthermore, as a drip bag 1B shown in FIG. 5, the center stuck part 13 may be formed in the shape of a kanji character "山", and then the center stuck part 13 is made continuous with the upper stuck part 12 so that the arm part 14 is partitioned into right and left parts. The drip bag 1B is also configured such that a pair of first oblique folding lines L1 and a pair of second oblique folding lines L2 are formed with the center line Z disposed between the oblique folding lines of each pair, the center line Z bisecting the bag body 2 in the direction of the width thereof, and these lines are formed at angles that satisfy the relation of $0<\theta2\leq\theta1$. Thus, as with the drip bag 1 mentioned above, one can wide open the opening 3 of the drip bag 1B only by opening the opening 3 as shown in FIG. 6, pulling out the pair of hook parts 11 in the opposite directions, and then hooking the hook parts on a cup.

Figure 7:
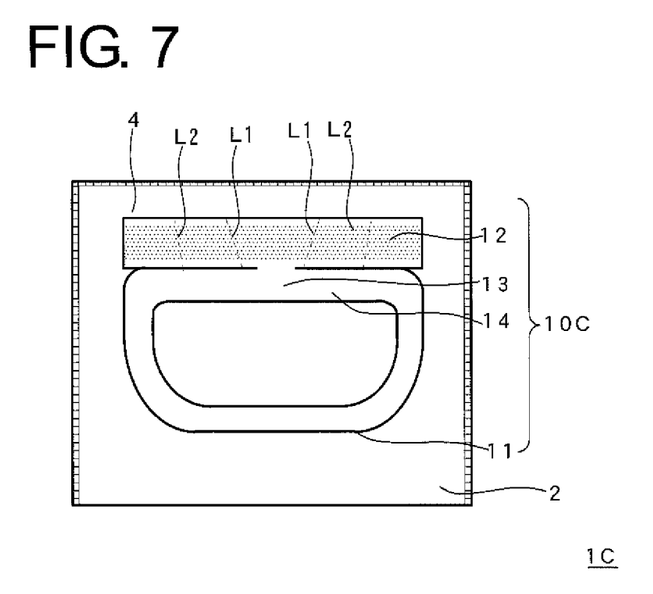
FIG. 7 is a plan view illustrating a drip bag 1C of an embodiment before being opened.

FIG. 7 shows a drip bag 1C which is shaped as a laterally elongated flat bag as compared with the drip bag 1 shown in FIG. 1 that has the bag body 2 shaped as a vertically elongated flat bag in a plan view. The hook members 10 are also laterally elongated.

The drip bag 1C has an elongated upper stuck part 12 along the opening 3 of the bag body 2, and the lower portion of the upper stuck part 12 at the center in the width direction thereof is continuous with a center part 13 that cannot be pulled out. The upper stuck part 12 is provided with a pair of first oblique folding lines L1 and a pair of second oblique folding lines L2 which are directed from the lower side to the upper side of the upper stuck part 12.

In the drip bag 1C, the center part 13 is not adhered to the bag body 2, but may also be adhered thereto to employ the center part 13 as a center stuck part.

The arm part 14 extends horizontally from the lower end of the center part 13 to the right and left directions, and the ends of an arc-shaped hook part 11 are connected to the right and left ends of the arm part 14.

Figure 8:
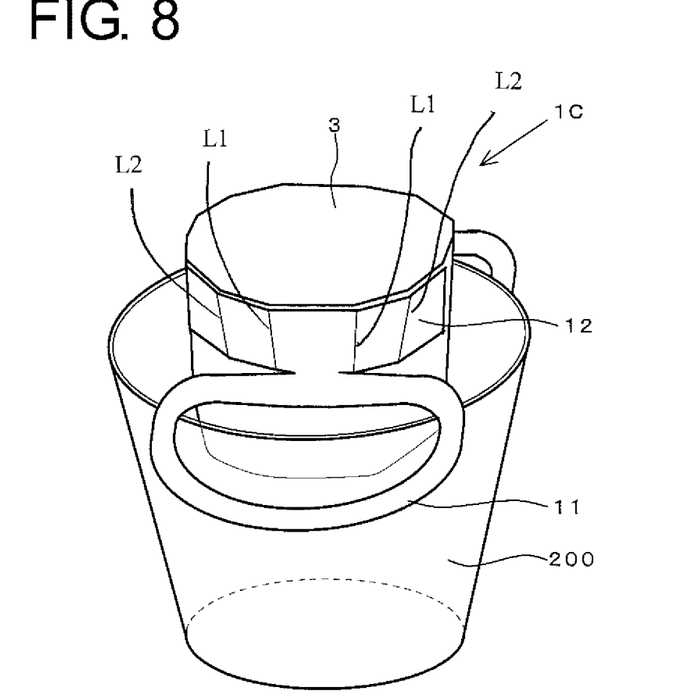
FIG. 8 is a perspective view illustrating the drip bag 1C of the embodiment which is set on a cup.

To hook the drip bag 1C to a cup, the hook parts 11 are pulled out in the mutually opposite directions so as to hook the hook parts 11 to the cup 200 as shown in FIG. 8. This causes all of the first oblique folding lines L1 and the second oblique folding lines L2 of the upper stuck part 12 to be folded and the opening 3 of the bag body 2 to be opened in a polygon with eight corners or more. It is thus possible to obtain a wide opening area.

REFERENCE SIGNS LIST 1, 1B, 1C, 1X drip bag
2 bag body
2p, 2q side edge
3 opening
4 opening guide line
10, 10B, 10X hook member
11, 11X hook part
12 upper stuck part, elongated stuck part
12a upper side of upper stuck part
12b lower side of upper stuck part
13 center part, center stuck part
14 arm part
15 hook
16 reinforcement part
20 water permeable filtering sheet
21 drip bag sheet
200, 200b cup
L1 first oblique folding line
L2 second oblique folding line
Lx folding line
W0 width of bag body
W1 separation between the pair of first oblique folding lines
W2 separation between the first oblique folding line L1 and the second oblique folding line
Z center line

The invention claimed is:
1. A drip bag comprising:
a bag body formed of a water permeable filtering sheet and having an upper end to be opened; and
a pair of hook members formed of a thin, flat sheet and provided on outer surfaces of two opposing face sheets of the bag body, wherein
the pair of hook members are respectively spaced apart from a side edge of each of the outer surfaces of the two opposing face sheets of the bag body,
each of the hook members includes: an upper stuck part which is adhered to the bag body along the opening of the bag body; a center part which is located below the upper stuck part at a center of the bag body with respect to a width direction of the bag body and formed so as not to be pulled out from the bag body; and a hook part not adhered to the bag body,
two or more pairs of oblique folding lines are formed side-by-side on the upper stuck part with a center line disposed between the oblique folding lines of each pair and tilted so as to be more spaced apart from the center line in the direction from a lower side to an upper side of the upper stuck part, the center line bisecting the bag body with respect to the width direction of the bag body, the two or more pairs of oblique folding lines being formed downwardly from the upper side of the upper stuck part, an angle θ1 formed by the center line and a first one of the oblique folding lines closer to the center line and an angle θ2 formed by the center line and a second oblique folding line that is farther away from the center line than the first oblique folding line satisfy 0<θ2<θ1, so that the opening is configured to be opened in the shape of a polygon having eight or more corners, where the opening is made of the upper sides of the upper stuck parts and the upper sides of the bag body between each of the side edge of the bag body and the upper stuck parts, only by pulling, in opposite directions, the hook parts on the two opposing face sheets of the bag body, and by the angle θ1 and the angle θ2 satisfying 0<θ2<θ1, the second oblique folding line is more easily folded than the first oblique folding line such that the opening maintains the shape of a polygon having eight or more corners as the hook parts are pulled further apart.

2. The drip bag according to claim 1, wherein two or three pairs of oblique folding lines are formed with the center line disposed between the oblique folding lines of each pair.

3. The drip bag according to claim 1, wherein three or more pairs of oblique folding lines are formed with the center line disposed between the oblique folding lines of each pair, and all the oblique folding lines satisfy the relation of 0<θ2<θ1 (for n≥2), where θn is an angle formed between the center line and an nth oblique folding line from the center line, and θn−1 is an angle formed between the center line and an (n−1)th oblique folding line from the center line.

4. The drip bag according to claim 1, wherein a separation on the upper side of the upper stuck part between the pair of first oblique folding lines is equal to a separation on the upper side of the upper stuck part between the first oblique folding line and the second oblique folding line which are adjacent to each other.

5. The drip bag according to claim 1, wherein three or more pairs of oblique folding lines are formed with the center line disposed between the oblique folding lines of each pair, and on the upper side of the upper stuck part, all separations between adjacent oblique folding lines are equal to each other.

6. The drip bag according to claim 1, wherein the center part is adhered to the bag body so as to form a center stuck part.

7. The drip bag according to claim 1, wherein the hook part has an arm part which is formed to be capable of being pulled out from the bag body, and the hook part is continuous with the center part through the arm part.

8. The drip bag according to claim 7, wherein a lower end of the arm part is continuous with the center part, and an upper end of the arm part is continuous with the hook part.

9. The drip bag according to claim 1, wherein the upper stuck part is an elongated stuck part formed in an elongated shape.

10. The drip bag according to claim 1, wherein an extraction material is filled in the bag body, and the upper end of the bag body is closed.

11. A drip bag comprising:

a bag body formed of a water permeable filtering sheet folded in two to form two opposing face sheets, the bag body having an upper end to be opened; and hook members formed of a thin, flat sheet, one of the hook members being provided on an outer surface of each of the two opposing face sheets of the bag body, wherein each of the hook members includes: an upper stuck part which is adhered to the bag body along the opening of the bag body; a center part which is located below the upper stuck part at a center of the bag body with respect to a width direction of the bag body and formed so as not to be pulled out from the bag body; and a hook part not adhered to the bag body, each of the two opposing face sheets includes two pairs of oblique folding lines formed on the upper stuck part with the oblique folding lines of each pair being symmetrically disposed on opposite sides of a center line, each of the oblique folding lines being tilted so as to be more spaced apart from the center line in the direction from a lower side to an upper side of the upper stuck part, the center line bisecting the respective face sheet of the bag body with respect to the width direction of the bag body, the two pairs of oblique folding lines extending downwardly from the upper side of the upper stuck part, an angle θ1 formed by the center line and a first one of the oblique folding lines closer to the center line and an angle θ2 formed by the center line and a second oblique folding line that is farther away from the center line than the first oblique folding line satisfy 0<θ2<θ1, so that the opening is configured to be opened in the shape of a polygon having eight or more corners, where the opening is made of the upper sides of the upper stuck parts and the upper sides of the bag body between each of the side edge of the bag body and the upper stuck parts, only by pulling, in opposite directions, the hook parts on the two opposing face sheets of the bag body, and by the angle θ1 and the angle θ2 satisfying 0<θ2<θ1, the second oblique folding the shape of a polygon having eight or more corners as the hook parts are pulled further apart.

12. The drip bag according to claim 11, wherein a third pair of oblique folding lines is formed with the center line disposed between the third pair of oblique folding lines.

13. The drip bag according to claim 11, wherein three or more pairs of oblique folding lines are formed with the center line disposed between the oblique folding lines of each pair, and all the oblique folding lines satisfy the relation of 0<θ2<θ1 (for n≥2), where θn is an angle formed between the center line and an nth oblique folding line from the center line, and θn−1 is an angle formed between the center line and an (n−1)th oblique folding line from the center line.

14. The drip bag according to claim 11, wherein a separation on the upper side of the upper stuck part between the pair of first oblique folding lines is equal to a separation on the upper side of the upper stuck part between the first oblique folding line and the second oblique folding line which are adjacent to each other.

15. The drip bag according to claim 11, wherein three or more pairs of oblique folding lines are formed with the center line disposed between the oblique folding lines of each pair, and on the upper side of the upper stuck part, all separations between adjacent oblique folding lines are equal to each other.

16. The drip bag according to claim 11, wherein the center part is adhered to the bag body so as to form a center stuck part.

17. The drip bag according to claim 11, wherein the hook part has an arm part which is formed to be capable of being pulled out from the bag body, and the hook part is continuous with the center part through the arm part.

18. The drip bag according to claim 17, wherein a lower end of the arm part is continuous with the center part, and an upper end of the arm part is continuous with the hook part.

19. The drip bag according to claim 11, wherein the upper stuck part is an elongated stuck part formed in an elongated shape.

20. The drip bag according to claim 11, wherein an extraction material is filled in the bag body, and the upper end of the bag body is closed.

* * * * *